US010353078B2

(12) United States Patent
Meredith et al.

(10) Patent No.: US 10,353,078 B2
(45) Date of Patent: Jul. 16, 2019

(54) VEHICLE ALERT SYSTEM USING MOBILE LOCATION INFORMATION

(71) Applicant: AT&T Intellectual Property I, L.P., Atlanta, GA (US)

(72) Inventors: Sheldon Meredith, Roswell, GA (US); Brandon Hilliard, Woodstock, GA (US); Rick Tipton, Corryton, TN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/462,555

(22) Filed: Mar. 17, 2017

(65) Prior Publication Data

US 2018/0268691 A1   Sep. 20, 2018

(51) Int. Cl.
*G01S 19/48* (2010.01)
*G08G 1/01* (2006.01)
(Continued)

(52) U.S. Cl.
CPC ............ *G01S 19/48* (2013.01); *G08G 1/0112* (2013.01); *G08G 1/0133* (2013.01);
(Continued)

(58) Field of Classification Search
CPC .. G08G 1/0967; G08G 1/0112; G08G 1/0133; G08G 1/0141; G08G 1/052;
(Continued)

(56) References Cited

U.S. PATENT DOCUMENTS 4,874,056 A   10/1989   Naito
5,982,325 A   11/1999   Thornton et al.
(Continued)

FOREIGN PATENT DOCUMENTS

DE   102006016767 A1   10/2007
KR   2009-0008514 A    1/2009
KR   2013-0062034 A    6/2013

OTHER PUBLICATIONS

Thompson et al.; "Using Smartphones to Detect Car Accidents and Provide Situational Awareness to Emergency Responders"; Int'l Conf. on Mobile Wireless Middleware, Operating Systems, and Applications; 2010 14 pages.
(Continued)

*Primary Examiner* — Leon Flores
(74) *Attorney, Agent, or Firm* — BakerHostetler

(57) ABSTRACT

A method includes receiving location data related to devices transmitted during a first interval. The location data includes at least two GPS points of a first device and a single GPS point of a second device. The method includes identifying a subset of the devices that are within a vicinity of an area associated with a traffic event based on the data. The method includes determining that the first device will not approach the area during a second interval based on the two GPS points and determining that the second device will not approach the geographic area during the second interval based at least on the single GPS data point and a second location datum. The method includes filtering the first and second devices from the subset and transmitting an alert indicative of the traffic event to the subset.

20 Claims, 10 Drawing Sheets

(51) Int. Cl.
    *G08G 1/052*  (2006.01)
    *G08G 1/0967*  (2006.01)
(52) U.S. Cl.
    CPC ........... *G08G 1/0141* (2013.01); *G08G 1/052* (2013.01); *G08G 1/096716* (2013.01); *G08G 1/096741* (2013.01); *G08G 1/096775* (2013.01)
(58) Field of Classification Search
    CPC ....... G08G 1/096716; G08G 1/096741; G08G 1/096775; G01S 19/48
    See application file for complete search history.

(56) References Cited

U.S. PATENT DOCUMENTS

| | | | |
|---|---|---|---|
| 6,658,343 | B1 | 12/2003 | Koch et al. |
| 7,102,496 | B1 | 9/2006 | Ernst et al. |
| 7,382,238 | B2 | 6/2008 | Kavaler |
| 7,421,894 | B2 | 9/2008 | Keep et al. |
| 7,615,750 | B2 | 11/2009 | Dupont et al. |
| 7,831,379 | B2 | 11/2010 | Nathan et al. |
| 7,912,628 | B2 | 3/2011 | Chapman et al. |
| 8,498,775 | B2 | 7/2013 | Yngve et al. |
| 8,731,815 | B2 | 5/2014 | Cummings |
| 8,773,289 | B2 | 7/2014 | Maggiore et al. |
| 8,791,803 | B2 | 7/2014 | Ishikawa |
| 9,031,779 | B2 | 5/2015 | Djugash et al. |
| 9,085,286 | B2 | 7/2015 | Lich et al. |
| 9,108,640 | B2 | 8/2015 | Jackson |
| 9,475,500 | B2 | 10/2016 | Grimm et al. |
| 9,499,172 | B2 | 11/2016 | Urmson et al. |
| 2004/0107042 | A1 | 6/2004 | Seick |
| 2007/0038360 | A1* | 2/2007 | Sakhpara ............ G08G 1/0104 701/117 |
| 2007/0152844 | A1* | 7/2007 | Hartley ............... G08G 1/0104 340/905 |
| 2007/0294023 | A1* | 12/2007 | Arcot .................. G08G 1/0104 701/117 |
| 2011/0043377 | A1 | 2/2011 | McGrath et al. |
| 2011/0112720 | A1 | 5/2011 | Keep et al. |
| 2013/0124073 | A1* | 5/2013 | Ren ........................ G08G 1/00 701/118 |
| 2014/0279707 | A1* | 9/2014 | Joshua ............... G06Q 30/0283 705/400 |
| 2015/0325122 | A1* | 11/2015 | Dicamillo ............. H04L 47/20 340/905 |
| 2016/0280224 | A1 | 9/2016 | Tatourian et al. |
| 2017/0124869 | A1* | 5/2017 | Popple ............ G08G 1/096725 |

OTHER PUBLICATIONS

Aloul et al.; "iBump: Smartphone Application to Detect Car Accidents"; Int'l Conference on IAICT; 2014; 5 pages.
"Big Data and Transport—Understanding and assessing options"; International Transport Forum; © 2015; 66 pages.
Fox Van Allen; "Google Maps Now Features Real-time Crowdsourced Accident Info"; http://www.techlicious.com/blog/google-maps-now-features-real-time-crowdsourced-accident-info/; Techlicous; Aug. 2013; accessed Jan. 3, 2017; 8 pages.
"How big data saves lives"; https://www.deospatialworld.com/article/how-big-data-saves-lives/; Geospatial World; © 2017; accessed Jan. 3, 2017; 7 pages.
Milan Goldas; "The role of Smartphones in connected car and driver services"; https://www.iot-now.com/2015/06/19/34134-the-role-of-smartphones-in-connected-car-and-driver-services/; IoT Now; © 2016; accessed Jan. 3, 2017; 4 pages.
Bertozzi et al.; "Adverse Driving Conditions Alert: Investigations on the SWIR Bandwidth for Road Status Monitoring"; Int'l Conf. on Image Analysis and Processing; 2013; p. 592-601.
Kalim et al.; "Crater: A Crowd Sensing Application To Estimate Road Conditions"; National University of Sciences & Technology—Pakistan; May 2015; 58 pages.
Douangphachanh et al.; "A Study of the Use of Smartphones for Road Roughness Condition Estimation"; Proceedings of the Eastern Asia Society for Transportation Studies; vol. 9; 2013; 14 pages.
Mednis et al.; "Embedded Solution for Road Condition Monitoring Using Vehicular Sensor Networks"; IEEE 6$^{th}$ Int'l Conf. on Application of Information and Communication Technologies; 2012; 6 pages.
De Zoysa et al.; "A Public Transport System Based Sensor Network for Road Surface Condition Monitoring"; Proceedings of the Workshop on Networked Systems For Developing Regions; 2007; 6 pages.
Douangphachanh et al.; "Using Smartphones to Estimate Road Pavement Condition"; Int'l Symposium for Next Generation Infrastructure; Oct. 2013; 10 pages.
Reininger et al.; "A First Look at Vehicle Data Collection via Smartphone Sensors"; IEEE Sensors Applications Symposium; 2015; 6 pages.

* cited by examiner

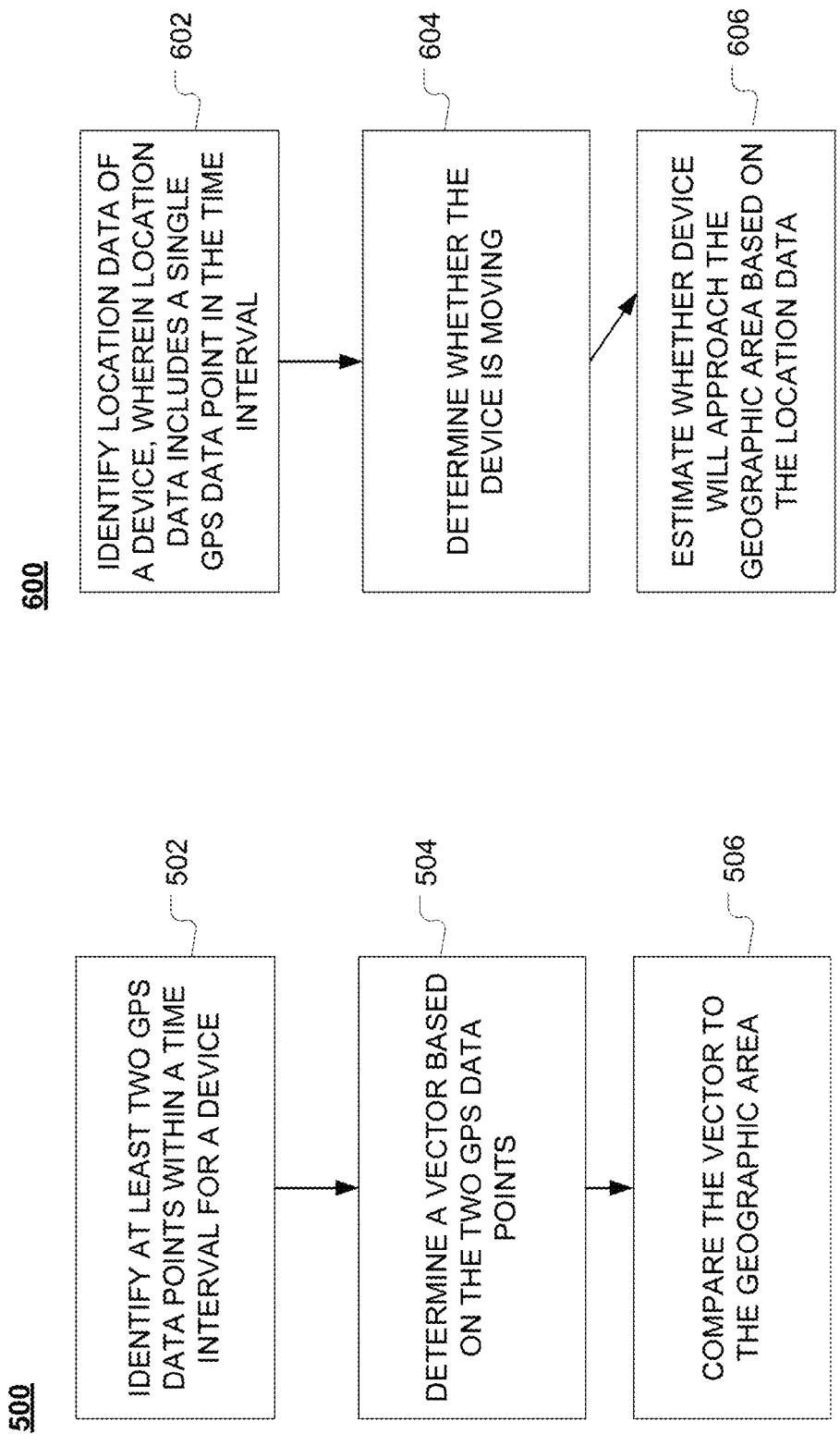

VEHICLE ALERT SYSTEM USING MOBILE LOCATION INFORMATION

TECHNICAL FIELD

The technical field generally relates to vehicle alerts and, more specifically, to identifying recipients to alert of a traffic event.

BACKGROUND

Road conditions may change dynamically due to a wide variety of causes where no prior avoidance notification is available to drivers. A common result of a driver's sudden realization of a hazardous condition is to brake hard or to swerve to avoid the hazard. This may be true for both transient traffic conditions, such as those caused by a traffic accident, and for chronic road conditions, such as at a blind turn where drivers regularly slow down. Alerting drivers of impending road conditions may be advantageous.

SUMMARY

Disclosed herein are systems, methods, and apparatuses that assist in providing alerts to vehicles that may encounter a traffic event. The disclosed systems, methods, and apparatuses may include different solutions pertaining to identifying recipients, from a plurality of devices, of these alerts.

In an aspect, this disclosure is directed to a method. The method may include receiving, at a network device of a network, location data transmitted during a first time interval. The location data may be related to a plurality of devices. The location data may include at least two global positioning system (GPS) data points of a first device, a single GPS data point of a second device, and information related to a velocity of a third device. The method may include identifying, based at least on the location data, a subset of the plurality of devices that are within a vicinity of a geographic area associated with a traffic event. The subset may comprise the first device, the second device, the third device, and a fourth device. The method may include filtering, by the network device, the third device from the subset based at least on the information related to the velocity of the third device indicating that the velocity of the third device does not exceed a threshold. The method may include determining that the first device will not approach the geographic area during a second time interval based at least on the at least two GPS data points. The method may include determining that the second device will not approach the geographic area during the second time interval based at least on the single GPS data point and a second location datum. The method may include filtering, by the network device, the first device and the second device from the subset and transmitting, via the network, an alert indicative of the traffic event to the subset.

In another aspect, this disclosure is directed to a system. The system may include an input/output and a processor communicatively coupled to the input/output. The system may include memory storing instructions that cause the processor to effectuate operations. The operations may include receiving, via the input/output, location data transmitted during a first time interval. The location data may be related to a plurality of devices. The location data may include at least two global positioning system (GPS) data points of a first device, a single GPS data point of a second device, and information related to a velocity of a third device. The operations may include identifying, based at least on the location data, a subset of the plurality of devices that are within a vicinity of a geographic area associated with a traffic event. The subset may include the first device, the second device, the third device, and a fourth device. The operations may include filtering the third device from the subset based at least on the information related to the velocity of the third device indicating that the velocity of the third device does not exceed a threshold. The operations may include determining that the first device will not approach the geographic area during a second time interval based at least on the at least two GPS data points and determining that the second device will not approach the geographic area during the second time interval based at least on the single GPS data point and a second location datum. The operations may include filtering the first device and the second device from the subset and transmitting, via the input/output, an alert indicative of the traffic event to the subset.

According to another aspect, this disclosure is directed to a method. The method may include receiving, at a network device of a network, location data transmitted during a first time interval. The location data may be related to a plurality of devices and may include at least two global positioning system (GPS) data points of a first device and a single GPS data point of a second device. The method may include identifying, based at least on the location data, a subset of the plurality of devices by filtering out a distant device that is outside of a vicinity of a geographic area associated with a traffic event. The subset may include the first device, the second device, and a third device. The method may include determining that the first device will not approach the geographic area during a second time interval based at least on the at least two GPS data points. The method may include determining that the second device will not approach the geographic area during the second time interval based at least on the single GPS data point and a second location datum. The method may include filtering, by the network device, the first device and the second device from the subset and transmitting, via the network, an alert indicative of the traffic event to the subset.

In an aspect, this disclosure is directed to a method. The method may include identifying devices that are within a vicinity of a geographic area affected by a traffic event based on location data of the devices. The method may include determining a subset of the devices that are estimated to approach the geographic area within the second time interval, the subset of devices comprising a first device and a second device. The method may include estimating that the first device will approach the geographic area within the first time interval based on at least two timestamped global positioning system (GPS) data points from within a second time interval. The method may include estimating that the second device will approach the geographic area within the second time interval based on exactly one GPS data point from within the second time interval and the second location data. The method may also include transmitting, to the subset of the devices, an alert of the traffic event.

In an aspect, this disclosure is directed to a method. The method may include identifying devices that are within a vicinity of geographic area affected by a traffic event based on location data of the devices. The method may also include, for a first device of the devices, wherein location data of the first device comprises at least two timestamped GPS data points within a time interval, estimating whether the first device will approach the geographic area within a second time interval based at least on the at least two timestamped GPS data points. The method may also include, for a second device of the devices, wherein the location data of the second device comprises a second location data and exactly one timestamped GPS data point within the time interval, estimating whether the second device will approach the geographic area within the second time interval based on the exactly one GPS data point and the second location data. The method may also include determining a subset of the devices that are estimated to approach the geographic area within the second time interval and transmitting, to the subset of the devices, an alert of the traffic event.

In another aspect, this disclosure is directed to a system. The system may include an input/output and a processor communicatively coupled to the input/output. The system may also include memory storing instructions that cause the processor to effectuate operations. The operations may include identifying devices that are within a vicinity of geographic area affected by a traffic event based on location data of the devices. The operations may also include, for a first device of the devices, wherein location data of the first device comprises at least two timestamped GPS data points within a time interval, estimating whether the first device will approach the geographic area within a second time interval based on the at least two timestamped GPS data points. The operations may also include, for a second device of the devices, wherein the location data of the second device comprises a second location data and exactly one timestamped GPS data point within the time interval, estimating whether the second device will approach the geographic area within the second time interval based on the exactly one GPS data point and the second location data. The operations may also include determining a subset of the devices that are estimated to approach the geographic area within the second time interval and transmitting, to the subset of the devices, an alert of the traffic event.

In accordance with another aspect, this disclosure is directed to a method. The method may include identifying a traffic event that is affecting a geographic area and identifying a plurality of devices that are within a vicinity of the geographic area based on location data associated with the plurality of devices. The location data may comprising, for each of the plurality of devices, at least one global positioning system (GPS) data point and a corresponding time data point. The plurality of devices may comprise a first group of devices and a second group of devices. Each device of the first group may be associated with at least two GPS data points having corresponding time data points with a time interval, and each device of the second group may be associated with exactly one GPS data points having corresponding time data point within the time interval. The method may include, for each device of the first group, based on the at least two GPS data points associated with the device, estimating whether the device will approach the geographic area within a time threshold. The method may include, for each device of the second group, based on a second location datum associated with the device and the exactly one GPS data point, estimating whether the device will approach the geographic area within the time threshold. The method may include compiling each device of the first group that is estimated to approach the geographic area within the time threshold and each device of the second group that is estimated to approach the geographic area within the time threshold to a subset of the plurality of devices. The method may include transmitting, to the subset of devices, an alert indicative of the traffic event.

BRIEF DESCRIPTION OF THE DRAWINGS

Aspects of the herein described vehicle alert systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers may refer to like elements throughout the application.

FIG. 5 is a flowchart of an exemplary method for communicating alert messages.

FIG. 6 is a flowchart of an exemplary method for communicating alert messages.

DETAILED DESCRIPTION

Figure 1:
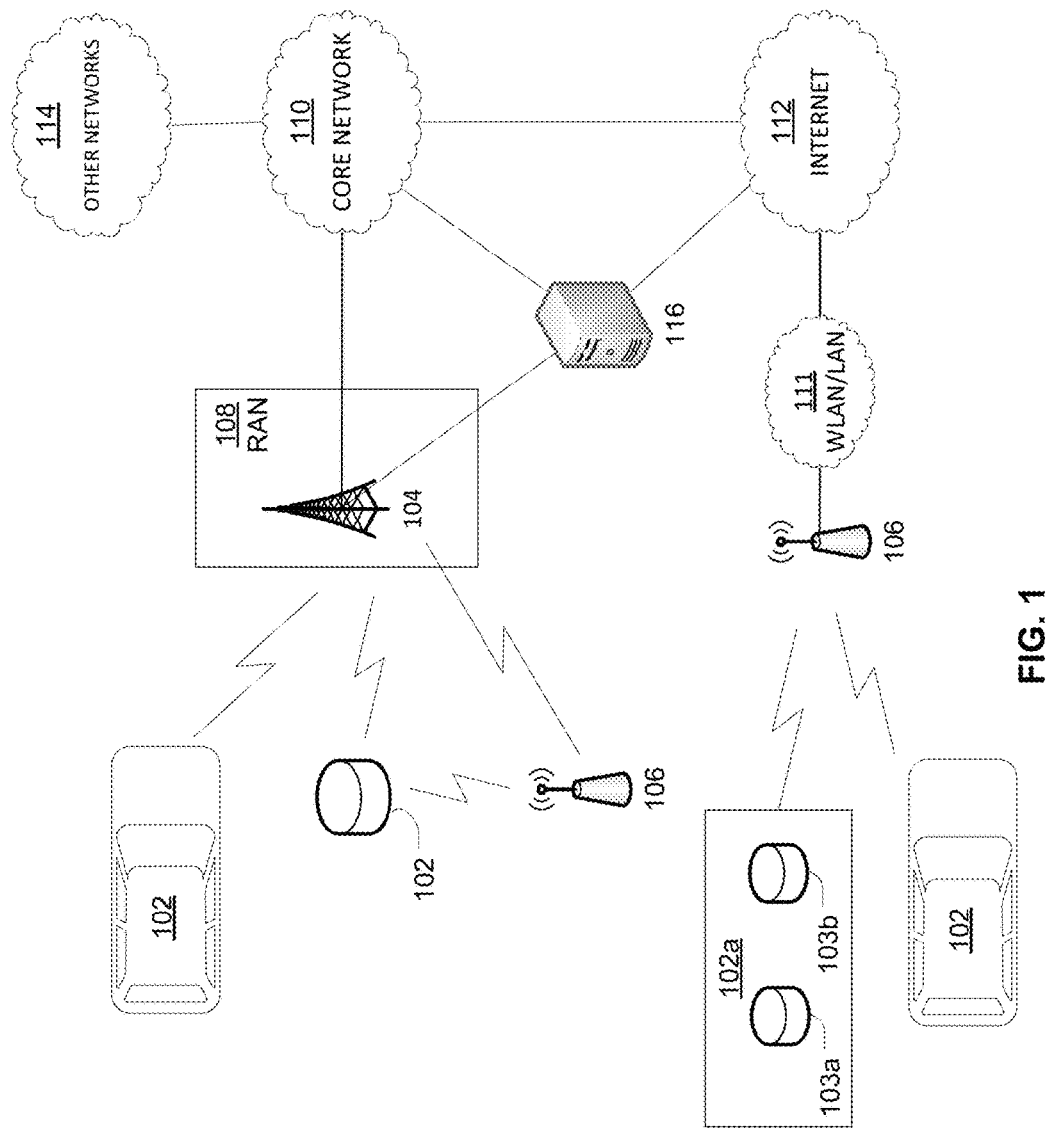
FIG. 1 illustrates an exemplary system for communicating vehicle alerts.

FIG. 1 illustrates a telecommunication system in which one or more devices 102, such as wireless transmit/receive units (WTRUs) or other network-connectable devices, may communicate via one or more access points, such as base stations 104 or Wi-Fi access points 106, to one or more networks. For example, devices 102 may include one or more end user devices, such as personal computers, tablets, smart phones, or other mobile devices; physical devices, like lighting equipment, televisions, home appliances, or the like; sensors or sensor-equipped systems, including health monitors, biometric sensors, sensors that track statistics on objects, environments, or other things; vehicles 103 including manned and unmanned vehicles, whether or not autonomous, robotic devices, machinery, and the like. Devices 102 may include other network-connected devices, including servers and backend systems. Devices 102 may include Internet of things (IoT) devices and devices that may communicate with IoT devices. Devices 102 may include devices that communicate through networks or technology other than cellular networks, such as those having 802.11XX connectivity.

While FIG. 1 illustrates each device 102 as a single device, device 102 may comprise related but distinct components. For example device 102a illustrates an end user device 103a, that is capable of receiving alerts via a network, such as a mobile phone, and a related device 103b that is related to end device 103a. Related device 103b may be another end device capable of receiving alerts via a network without device 103a relaying such alerts, such as another mobile device that has some type of relationship with device 103a. Alternatively, related device 103b may be linked to network via device 103a, such as a Bluetooth® or NFC-connected device that communicates with device 103a, such as a wearable device, like a health monitoring device or a smart watch. Devices 103a and devices 103b may have some type of relationship to one another, such that together they may be treated as device 102, for purposes of determining their location or communicating alerts based on their location. For example, device 103b and device 103a may be linked to the same user account, or they may be linked to different users on a family plan. Historical behavior may indicate that devices 103a and devices 103b are used together, or are co-located, at least a certain percentage of time, or during certain time periods of the day, week, month, or year, etc. As another example, devices 103a and 103b may be in communication with one another, such as via wireless (e.g. Bluetooth® or NFC technologies) or wired communication.

Each of base stations 104 may be any type of device configured to wirelessly interface with at least one device 102 to facilitate access to or communication with network 118. By way of example, base stations 104 may be a base transceiver station (BTS), a Node-B, an eNode B, a Home Node B, a Home eNode B, a site controller, an access point (AP), a wireless router, or the like. While base stations 104 are each depicted as a single element, it will be appreciated that base stations 104 may include any number of interconnected base stations or network elements.

Each of wireless access points 106 may be any type of device configured to wirelessly interface with at least one device 102, such as vehicles 103, to facilitate access or communication with one or more networks through an internet service protocol. For example, wireless access point 106 using a wireless protocol such as Bluetooth, Zigby, WiGig, or one or more of the variants of the IEEE 802.11 protocol. For example, wireless access point 106 may include a Wi-Fi hotspot, a router, or the like.

Telecommunication system 100 may include one or more networks, such as a radio access network (RAN) 108, a core network 110, a wireless local area network (WLAN) 111, the Internet 112, or other networks 114. The disclosed examples contemplate any number of devices 102, base stations 104, wireless access points 106, networks, or network elements.

RAN 108 may include one or more base stations 104, along with other network elements (not shown), such as a base station controller (BSC), a radio network controller (RNC), or relay nodes. One or more base stations 104 may be configured to transmit or receive wireless signals within a particular geographic region, which may be referred to as a cell (not shown). The cell may further be divided into cell sectors. For example, the cell associated with base station 104 may be divided into three sectors such that base station 104 may include three transceivers: one for each sector of the cell. In another example, base station 104 may employ multiple-input multiple-output (MIMO) technology and, therefore, may utilize multiple transceivers for each sector of the cell.

Base stations 104 may communicate with one or more of devices 102 over an air interface, which may be any suitable wireless communication link (e.g., radio frequency (RF), microwave, infrared (IR), ultraviolet (UV), or visible light). The air interface may be established using any suitable radio access technology (RAT).

More specifically, as noted above, telecommunication system 100 may be a multiple access system and may employ one or more channel access schemes, such as CDMA, TDMA, FDMA, OFDMA, SC-FDMA, or the like. For example, base station 104 in RAN 108 and devices 102, such as vehicles 103, connected to RAN 108 may implement a radio technology such as Universal Mobile Telecommunications System (UMTS) Terrestrial Radio Access (UTRA) that may establish air interface using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example, base station 104 and devices 102, such as vehicles 103, that are connected to RAN 108 may implement a radio technology such as Evolved UMTS Terrestrial Radio Access (E-UTRA), which may establish communication using LTE or LTE-Advanced (LTE-A).

Optionally base station 104 and devices 102, such as vehicles 103, connected to RAN 108 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 104 may be a wireless router, Home Node B, Home eNode B, or access point, for example, and may utilize any suitable RAT for facilitating wireless connectivity in a localized area, such as a place of business, a home, a vehicle, a campus, or the like. For example, base station 104 and associated devices 102 may implement a radio technology such as IEEE 602.11 to establish a wireless local area network (WLAN). As another example, base station 104 and associated devices 102 may implement a radio technology such as IEEE 602.15 to establish a wireless personal area network (WPAN). In yet another example, base station 104 and associated devices 102 may utilize a cellular-based RAT (e.g., WCDMA, CDMA2000, GSM, LTE, LTE-A, etc.) to establish a picocell or femtocell.

RAN 108 may be in communication with core network 110, which may be any type of network configured to provide voice, data, applications, or voice over internet protocol (VoIP) services to one or more devices 102, such as vehicles 103. For example, core network 110 may provide call control, billing services, mobile location-based services, pre-paid calling, Internet connectivity, video distribution or high-level security functions, such as user authentication. Although not shown in FIG. 1, it will be appreciated that RAN 108 or core network 110 may be in direct or indirect communication with other RANs that employ the same RAT as RAN 108 or a different RAT. For example, in addition to being connected to RAN 108, which may be utilizing an E-UTRA radio technology, core network 110 may also be in communication with another RAN (not shown) employing a GSM radio technology.

Core network 110 may also serve as a gateway for devices 102, such as vehicles 103, to access Internet 112 or other networks 114. Internet 112 may include a global system of interconnected computer networks or devices that use common communication protocols, such as TCP, user datagram protocol (UDP), or IP in the TCP/IP internet protocol suite. Other networks 114 may include wired or wireless communications networks owned or operated by service providers that differ from the service provider that owns or operates core network 110. For example, other networks 114 may include another core network connected to one or more RANs, which may employ the same RAT as RAN 108 or a different RAT.

Some or all devices 102 in telecommunication system 100 may include multi-mode capabilities. That is, devices 102 may include multiple transceivers for communicating with different wireless networks over different wireless links. For example, one or more devices 102 may be configured to communicate with base station 104, which may employ a cellular-based radio technology, and with access point 106, which may employ an IEEE 802 radio technology.

Telecommunication system 100 may include functionality for communicating vehicle alerts. For example, telecommunication system 100 may include an alert server 116. Alert server 116 may comprise any appropriate type of equipment, such as, for example, a computer, a server, a mobile device, a tablet, or any type of equipment capable of receiving and processing acceleration and location data to facilitate identifying traffic events, devices 102 that may be imminently impacted by that traffic event, and relaying alerts of the traffic event to those identified devices. Alert server 116 may receive an alert from an originator. Additionally or alternatively, alert server 116 may determine that a traffic event has occurred and in response generate the alert. In an aspect, alert server 116 may comprise or be in communication with core network 110. For example, alert server 116 may be controlled by the service provider or network operator of core network 110.

Alert server 116 may communicate alerts to vehicles 103. A traffic event may be characterized by a sudden change in speed or acceleration of traffic. A traffic event may affect a geographic area. A geographic area may include, for example, a traffic lane, a stretch of a highway, a street, an on-ramp, an off-ramp, an intersection, the like, or any combination thereof. The precision of how the geographic area may vary. For example, a geographic area may include roads on which traffic is traveling in a particular direction (e.g., away from a city center), certain traffic lanes on a highway (e.g., non-HOV lanes on I-75S), or any other defined scope. Detecting a traffic event may be based on sensor data collected from one or more devices 102 proximate to the geographic area.

Figure 2:
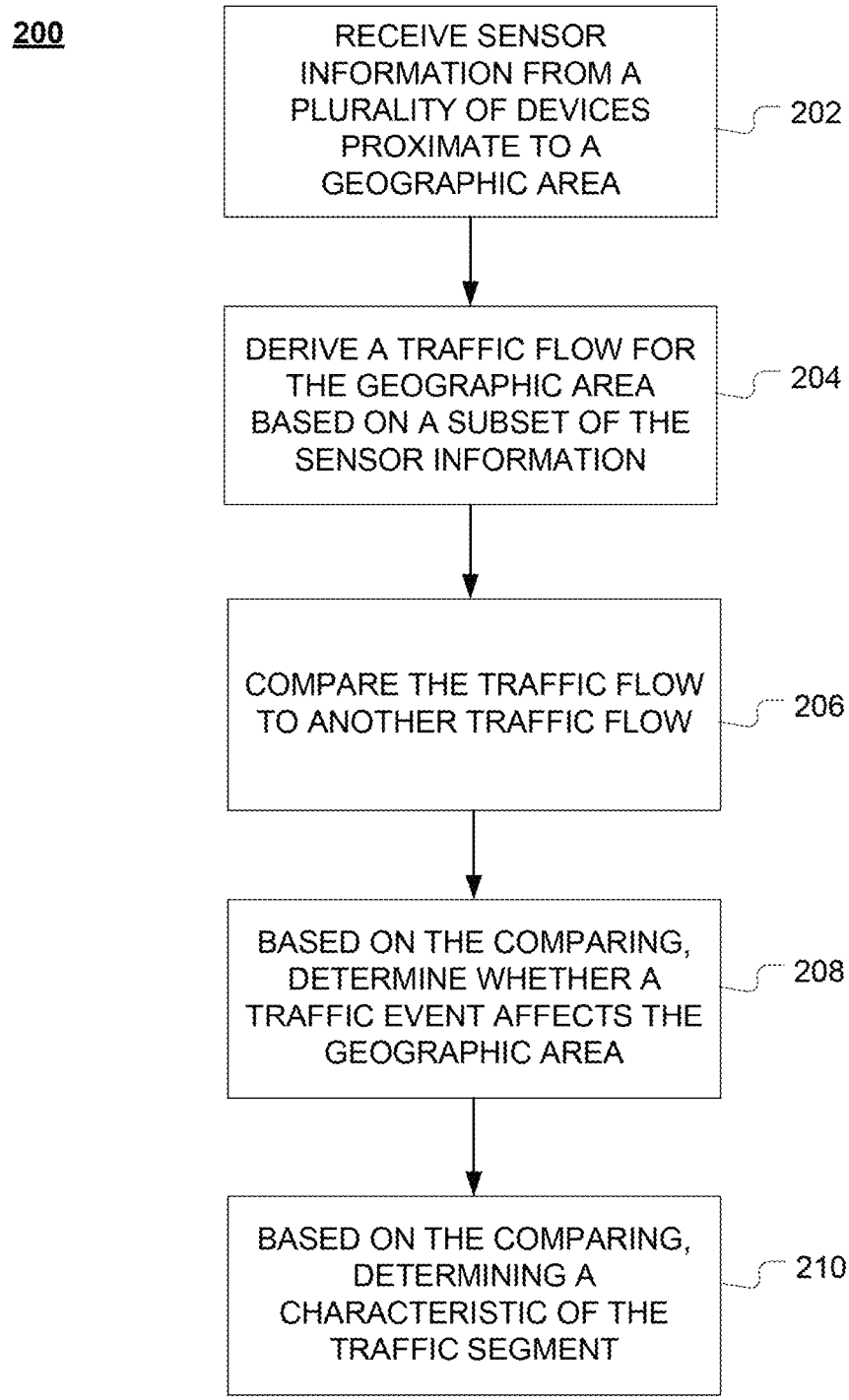
FIG. 2 is a flowchart for an exemplary method of detecting a traffic event affecting a geographic area.

FIG. 2 is a flowchart for an exemplary method 200 that may be used within system 100 for detecting a traffic event. At step 202, method 200 may include receiving sensor information from a plurality of devices 102. The sensor information may comprise location information, such as GPS locations or cell ids, speed information, such as lateral or linear speed, acceleration information, such as lateral or linear information, or the like. Step 202 may include filtering sensor information. For example, sensor information originating from devices 102 that are stationary or outside of a proximity of the geographic area may be filtered out. Further, sampling of the sensor information may be done.

At step 204, a traffic flow of the geographic area may be derived based on a subset of the sensor information. For example, the traffic flow may be an acceleration pattern of the geographic area. As another example, the traffic flow may be a velocity pattern of the geographic area. The traffic flow may be multi-faceted. For example, the acceleration pattern or velocity pattern may be measured in line with the shape of the geographic area (e.g., measuring acceleration or speed along the road or other geographic area). Optionally, the acceleration or velocity pattern may also be measured laterally to the shape of the geographic area. For example, this lateral measurement may be used to identify where vehicles 103 are swerving, such as to avoid an object in the road or as a result of road conditions (e.g., potholes, ice).

At step 206, method 200 may include comparing the traffic flow to another traffic flow. For example, another traffic flow may include a speed limit, historical traffic flows, traffic flows for other geographic areas near the geographic area. For example, comparing the traffic flow to historical traffic flows can be used to detect anomalous events, such as a car accident, that is affecting the current traffic flow. As another example, comparing the traffic flow to historical traffic flows could be sued to detect time-based events, such as rush-hour induced slowdowns. As yet another example, comparing the traffic flow to a traffic flow for a nearby geographic area could be used to detect sudden changes in speed or acceleration. For example, comparing the acceleration pattern of an upstream or downstream geographic area can indicate that a bottleneck exists at the geographic area. Thus, based on the comparing of step 206, at step 208, method 200 may include determining whether a traffic event is affecting the geographic area.

The comparing may also provide additional data regarding the traffic event. For example, at step 210, method 200 may include identifying one or more characteristics of the traffic event. For example, as discussed above, the comparing may indicate that the traffic event is time-related event, such as rush hour. Regularly occurring traffic events, such as rush-hour induced traffic congestion, may be identified as chronic. Other chronic traffic events may include those that are present for a threshold period of time. For example, a chronic traffic event may include a bottleneck in which traffic regularly slows suddenly, such as a blind curve or a narrowing of the lanes. As another example, a chronic traffic event may include a pothole or object in the road that has been present for a predefined period of time. The period of time by which a traffic event is considered chronic may vary. For example, the period of time may depend upon such factors as the type of traffic event (e.g., pothole or blind curve), how much the event impacts the traffic flow, or the like. Other characteristics of the traffic event may include the length of the geographic area, the impact the traffic event has on the traffic flow (e.g., how long of a delay the traffic event creates), the type of traffic event, or the like.

Method 200 may also include identifying traffic events or the geographic areas they affect based on additional or different data. For example, traffic events may also be identified based on user-input data, reports of traffic events, such as those from users of devices 102, communications with emergency response systems, such as public-safety answering points, radio communications of fire or police departments, news reports, or other data sources. These secondary data sources may be used alone or in conjunction with sensor data from devices 102 to identify traffic events.

Figure 3:
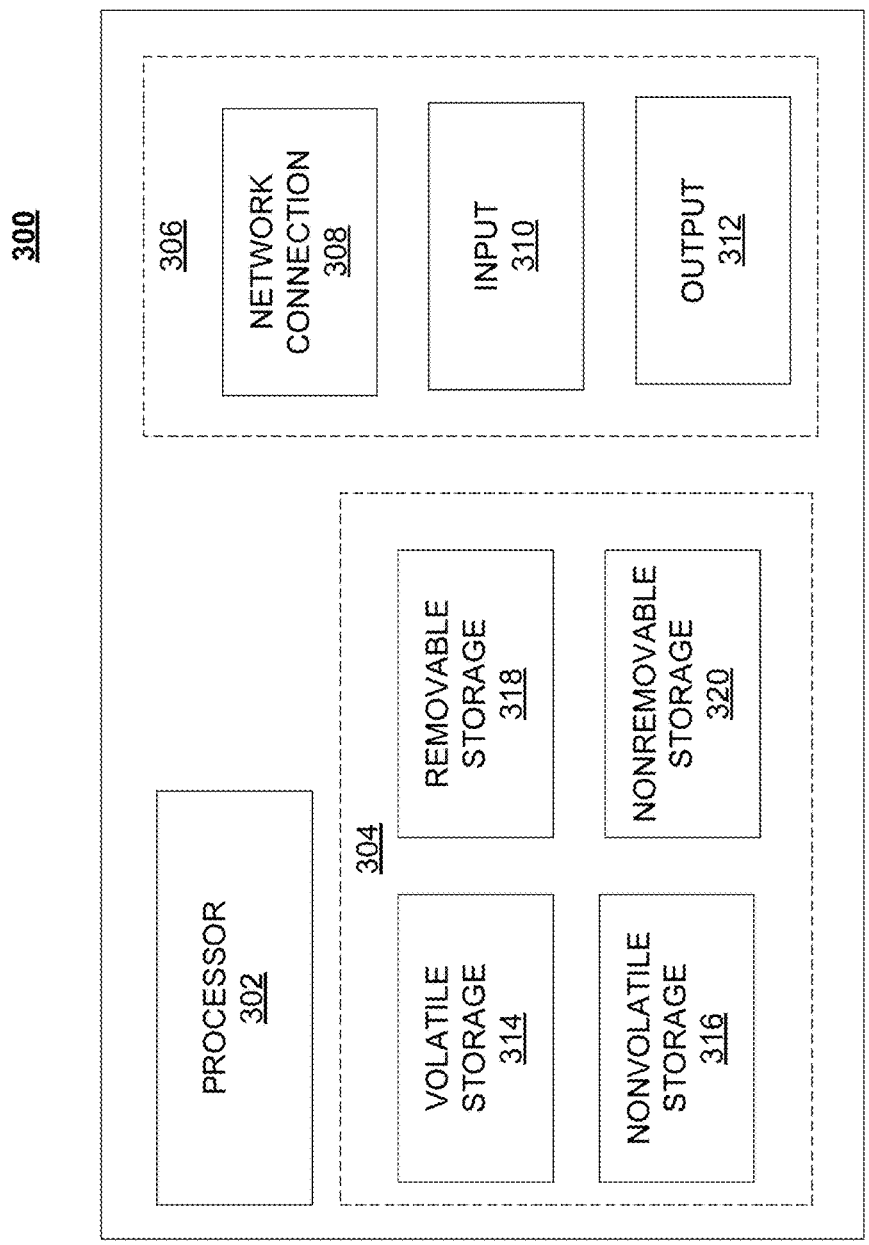
FIG. 3 is a schematic of an exemplary network device.

FIG. 3 is a block diagram of a network device 300. Network device 300 may be used for detecting traffic events or communicating or displaying alerts of traffic events. Network device 300 may be connected to or comprise a component of telecommunication system 100. For example, one or more of devices 102, related devices 103*a* and 103*b*, access points 106, or alert server 116 may comprise all or a portion of network device 300. Network device 300 may comprise hardware or a combination of hardware and software.

The functionality to facilitate telecommunications via a telecommunications network may reside in one or a combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 may also contain one or more network connections 308 that allows network device 300 to facilitate communications between devices 102 and networks, such as WLAN 111 or Internet 112. Network connections 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 for receiving user inputs, such as keyboard, mouse, pen, voice input device, or touch input device. Input/output system 306 may also include an output device 312, such as a display, speakers, vibration outputs, or a printer.

For example, device 102 or access point 106 may comprise network device 300 in which input/output system 306 may include an IEEE 802.11-compliant transceiver. Optionally, input/output system 306 of device 102 or access point 106 may also include a transceiver for communicating with a cellular network, such as core network 110, through one or more RANs 108. Further, input/output system 306 of access point 106 may include one or more network connections for connecting other devices 102 to a network, such as Internet 112.

Processor 302 may be capable of performing functions associated with telecommunications, such as functions for generating or processing alerts, as described herein. For example, processor 302 may be capable of, in conjunction with any other portion of network device 300, providing sensor data or traffic flow patterns to determine traffic events, identifying recipients of an alert of a traffic event, transmitting alerts of traffic events, or receiving alerts of traffic events, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to generate, transmit, or receive alerts of traffic events.

On a traffic event or geographic area affected by a traffic event is detected, devices 102 that may be impacted by the traffic event—such as devices 102 approaching the geographic area within a certain time period—may be identified. There are multiple ways of identifying such devices 102. For example, given a plurality of devices 102, an affirmative approach may be used to identify which devices 102 are predicted to approach the geographic area. As another example, for the same plurality of devices 102, a process of elimination may be used, in which devices 102 that are not expected to approach the geographic area are filtered from a subset of the plurality of devices 102 before alerting the devices of that subset. As yet another example, the subset to which the alert is communicated may be identified by a combination of adding certain devices 102 and removing certain other devices 102. For example, for since devices 102 may be operating under different conditions, it may not be possible to affirmatively confirm or deny that a particular device 102 will approach geographic area based on the location data available for that particular device 102. When dealing with a large number of a plurality of devices, a method for selecting the subset to alert may also include making certain assumptions to efficiently communicate the alert.

Figure 4A:
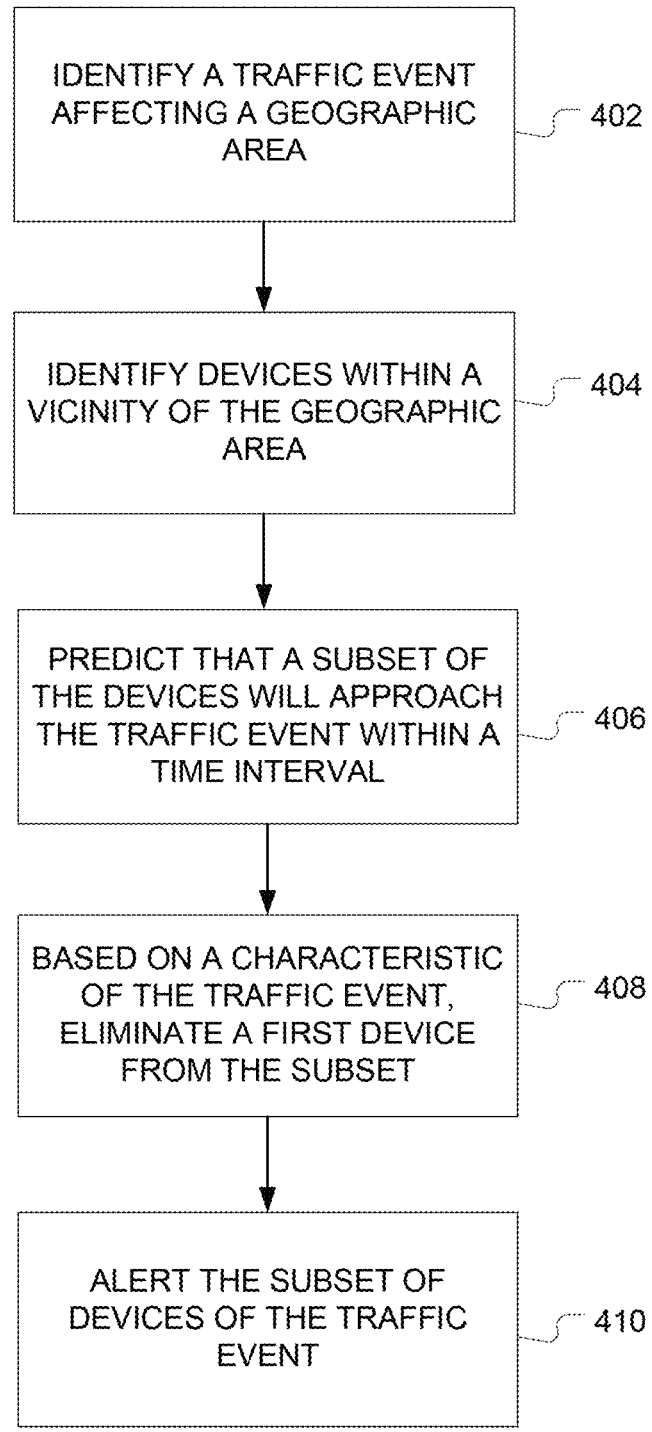
FIG. 4A is a flowchart of an exemplary method for communicating alert messages.

FIG. 4A is a flowchart of an exemplary method 400 for alerting devices 102 of a traffic event. At step 402, method 400 may include identifying a traffic event that is affecting a geographic area. As an example, step 402 may be performed by all or a portion of method 200.

At step 404, method 400 may include identifying devices 102 that are within a vicinity of a geographic area based on location data associated with devices 102. The location data of a device may indicate its location at a point in time. For example, the location data may comprise a GPS data point. Location data may comprise data regarding the identity and location access points 106 detected by device 102 and the strength of the signals that device 102 detected from such access points 106. Location data may comprise data regarding the identity of the base station(s) 104 or access point(s) 106 with which device 102 is connected, or which device 102 can detect. For example, location data may include the cell id of the cell in which device 102 is located. For example, the cell id may correspond to the base station 104. As another example, handovers (or handoffs) between base stations 104 or access points 106 may also be location data.

The accuracy of the location data may depend upon the type of the location data. For example, GPS data points may have an accuracy on the order of about 3.5 meters. As another example, device 102's detection of access point 106 may indicate device 102's location with approximately 400 meter accuracy. As another example, a cell id may identify a geographic location on the order of 1 to 30 kilometers. These accuracies may be affected based on specific factors in a given situation. For example, GPS data points may be less accurate in locations densely populated by high rises, as a result of multi-path interference. As another example, the accuracy of a location based on device 102 detecting access point 106 may depend upon the operating characteristics of access point 106. Further, the size of a cell (and in turn, the accuracy of a location based on device 102 being in a cell) may vary based on density of base stations 104 in the area.

Location data may be compiled together to improve accuracy. For example, the accuracy of a location based on device 102 being able to sense multiple access points 106 may be greater than if the location was based only on device 102 sensing a single access point 106. As another example, further considering signal strengths along with those detected access points 106 may further improve accuracy. Location data may also include analysis of raw location data. For example, location data may include a Rayleigh fading rate, trilateration based on multiple locations (and optionally signal strengths), or other known location techniques.

Identifying devices 102 within a vicinity of the geographic area may be based on the accuracy of location data associated with that particular device 102. For example, if the location of device 102 is based on GPS data points, the vicinity may be a first threshold. As another example, if the location of another device 102 is based on lower-accuracy data, such as cell id, then the vicinity may differ. For example, it may be desirable to filter out those devices 102 that, based on their GPS location, are more than 1 km downstream of the geographic area (e.g., such that their GPS location indicates that even if such device 102 is traveling in the direction of the geographic area, the device 102 has already passed the traffic event). On the other hand, it may not be appropriate to eliminate devices 102 whose only location data indicates that they are within the cell that includes that location 1 km downstream of the geographic area, particularly if the same cell also includes the geographic area and another geographic area that is contiguous to and upstream of the geographic area affected by the traffic event. Step 406 includes predicting or estimating that a subset of devices 102 will approach the geographic area within a time interval.

For example, FIG. 5 illustrates a method 500 for estimating whether a device 102 will approach the geographic area within the time interval based on at least two GPS data points. Step 502 may include identifying at least two GPS points of device 102, and these GPS data points may each include a location point and a corresponding timestamp the location data of device 102. Step 504 may include calculating a speed vector for a particular device 102. For example, given at least two GPS points that each include a location point and a corresponding timestamp, a vector can be calculated and used to estimate a future location of device 102. Thus, step 506 may include comparing the speed vector of a particular device 102 to the geographic area, as well as to the roadways that connect a GPS location of the particular device 102 to the geographic area. This may include calculating a predicted time of arrival of device 102 to the geographic area. The predicted time of arrival may be determined based on speed or acceleration patterns of device 102, which may also be calculated based on the location data of the particular device 102.

FIG. 6 illustrates a method 600 for determining whether a second device 102 will approach a geographic area based on location data where such location data includes at most one GPS data point within a time interval. For example, location data may include one GPS data point within a time interval and a second location data of second device 102. As another example, the location data of second device 102 may include no GPS data points within the time interval.

Thus, at step 602, method 600 may include second location data of the second device 102. Optionally, step 602 may include identifying a GPS data point within the time interval of second device 102. As discussed above, second location data may include non-GPS information (that is, location data that does not include or is not derived from GPS data), such as cell identifier, a Wi-Fi location, access point 106 detected by second device 102, access point 106 handoff, or a Rayleigh fading point. Additionally or alternatively, second location data may include a historical traffic activity of second device 102.

At step 604, method 600 may include determining whether second device 102 is moving. This may be based on sensor data of second device 102 (e.g., data from an accelerometer. Additionally or alternatively, this may be based on other second location data, such as by comparing a location indicated by the GPS data point to a location indicated by other second location data. At this stage, devices 102 that were not moving, or are found to be moving away from the geographic area, may be eliminated and excluded from devices 102 that re alerted of the traffic event.

Step 606 includes identifying those second devices 102 are estimated to be moving towards the geographic area are identified. This estimation may be based on the location history of second device 102 approaching the geographic area. The estimation may further be based on the accuracy of second location data. Similarly, the time interval in which the estimated arrival of the geographic area is to occur) may also be based on the second location data.

Returning to FIG. 4A, as mentioned above, step 406 may include determining whether the particular device will reach the geographic area within a time interval. This may be based on, for example, the predicted time of arrival. The value of the time interval (e.g., within the next 90 seconds, 5 minutes, etc.), may depend upon a variety of factors. For example, the time interval may be set based on the speed of device 102 or a characteristic of the traffic event. For example, for devices 102 traveling at slower speeds, the time interval may be smaller, as it may take less time for the driver or device 102 to react to the traffic event. By contrast, for devices 102 traveling at higher speeds, it may take more time for driver or device 102 to react to the traffic event. As another example, for traffic events that cause a complete standstill of traffic, or which may be particularly dangerous, such as icy conditions, the time interval may be longer.

For devices 102 for which the location data is below an accuracy threshold, estimating whether those devices 102 will approach the geographic area may involve different factors. For example, those devices 102 may not have location data that includes two GPS points usable for calculating a speed vector. For example, device 102 may not have any GPS points associated with it. Alternatively, device 102 may only have expired GPS data points. That is, for predicting location patterns, the GPS points outside of a given time interval may be inaccurate. Setting this time interval may be based on a variety of factors, and it may be based on the particulars of a given device 102. For example, location data for a given device 102 that includes two GPS points, but those GPS points predate (by time) other types of location data (e.g., cell id, handover points, or sensed access points), and that other location data is inconsistent with the GPS points, then it may be assumed that device 102 is no longer on the same trajectory suggested by those two GPS points.

Optionally, identifying devices 102 to alert of the traffic event may be based on other factors. For example, such other factors may include the density of the geographic area, the accuracy of device 102's location data, or the like. If the geographic area is in a high-density area, which may be based on the density of roadways, the amount of vehicular traffic in the area, a highly populated area, or the like, then the threshold for whether to alert a device may require the accuracy to meet a specific threshold. As another example, the estimated location of device 102 may need to be within a specific range of the geographic area, and that range may be based on the density of the area or the accuracy of that estimated location (e.g., the accuracy of the location data).

Based on step 406 (e.g., method 500 and 600), a subset of devices 102 may be identified, wherein each device 102 of the subset are estimated to approach time segment within the time interval.

At step 408, additional filtering of devices 102 may be performed. For example, traffic event may be considered chronic. Thus, historical traffic patterns of devices 102 may be determined. If a particular device 102 frequently traverses the geographic area (and thus, regularly encounters the traffic event), that device 102 may be filtered out of the subset. As another example, the traffic event may be based on data collected from certain types of vehicles 103, while the acceleration or speed patterns of other types of vehicles 103 may not be affected by the traffic event. For example, a speed bump may be small enough that only compact cars slow down. Thus, first device 102 that is associated with a four-wheel drive SUV that is not surrounded by other compact cars, may be filtered out of the subset.

At step 410, devices 102 of the subset, and other devices 102 that are predicted to approach the geographic area within a time interval, may be alerted to the traffic event. This may include transmitting an alert to device 102 within a certain amount of time (e.g., 1 minute) prior to the estimated time of arrival of that device 102 to the geographic area. Further, the alert may include specific details related to the traffic event, including an indication of an absolute or relative location of the geographic area to device 102, a characteristic of the traffic event, or an observed or estimated effect of the traffic event on the geographic area, such as an approximate traffic speed at the geographic area.

Figure 4B:
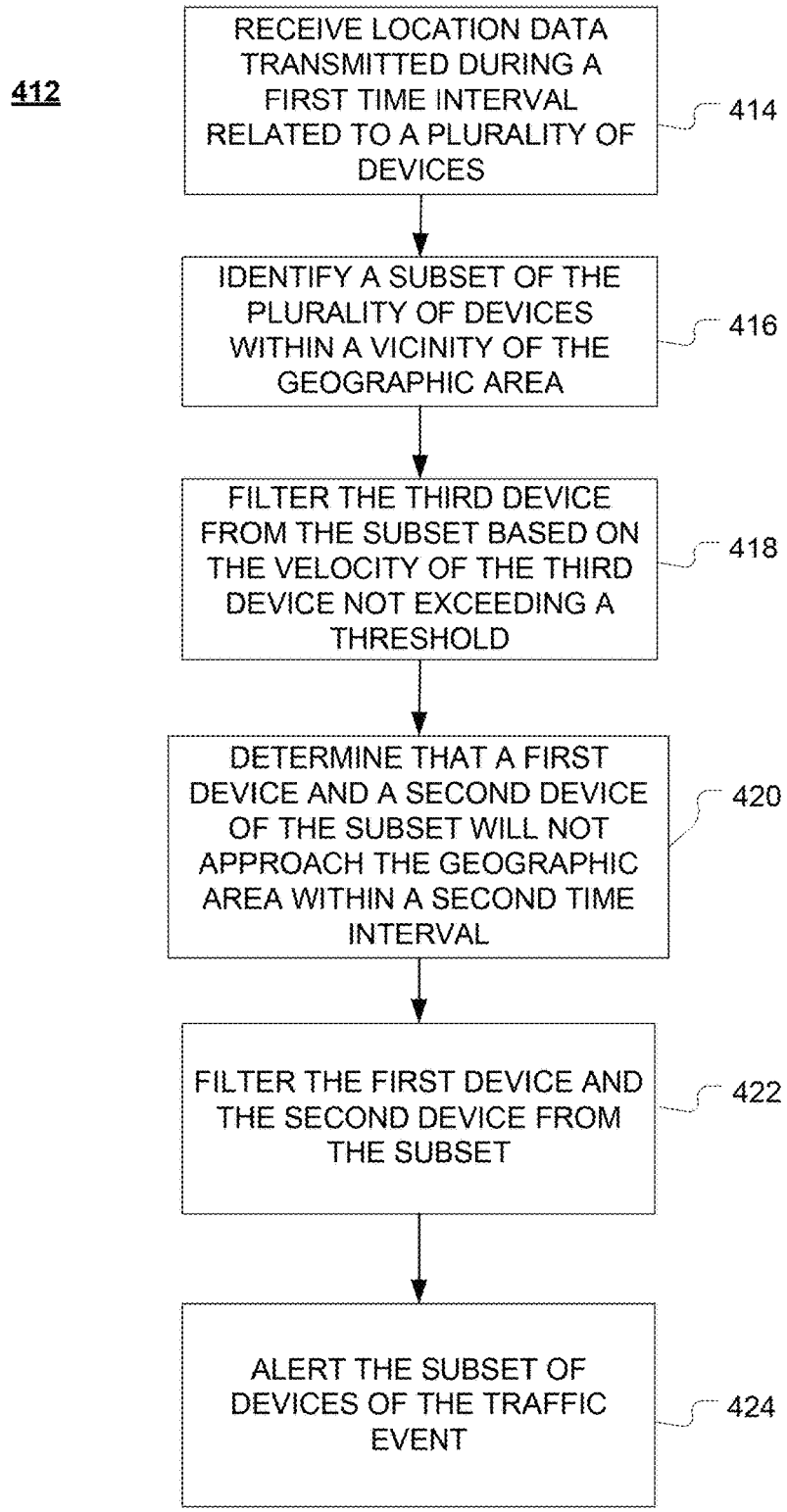
FIG. 4B is a flowchart of an exemplary method for communicating alert messages.

FIG. 4B is a flowchart of an exemplary method 412 for alerting devices 102 of a traffic event. As compared to method 400, method 412 may produce a similar result—transmitting an alert indicative of the traffic event to the subset of devices 102. One difference may be how method 412 populates the subset of devices 102.

At step 414, method 400 may include receiving location data transmitted within a first time interval. Data transmitted within a first time interval may include, but not necessarily be limited to, data associated with a time existing within that first time interval or data timestamped with a time contained in the first time interval. The location data may be related to a plurality of devices 102. The first time interval may be predefined, and it may be set at a threshold such that the location data within that time interval may be used to predict—with a desired degree of accuracy—a current location or current trajectory of device 102. That is, location data may become "stale" or inaccurate for predicting how device 102 will move from that past location to future locations within a later second time interval. For example, using location data of device 102 that indicates yesterday that device 102 was travelling north on a particular highway to predict that the same device 102 has continued to travel in the direction on the same highway for the past twenty hours may have a low likelihood of being accurate. Whereas, in contrast, location data indicates device 102 was travelling in the same manner five minutes ago may be a more reliable predictor of that device 102 continuing to travel in the same way five minutes later.

This manner of predicting trajectory may be different than, for example, detecting historical patterns based on past, repetitive behavior. For example, other location data transmitted outside of the first time interval may be used in this manner. For example, if location data of device 102 within the first time interval indicates device 102 is located near the workplace of the user of device 102, and the historical behavior of device 102 indicates that around 7:00 PM on weekdays device 102 travels towards the home of the user of device 102, then such location data, even though it is outside of the first time interval, may be used to predict that device 102 will travel at a second time interval, around 7:00 PM, towards that home.

The type(s) and amount of location data for each device 102 may vary. At a high level, location data may comprise data that indicates a location or movement of device 102. For example, one or more devices 102, such as a first device 102, may be related to a plurality of GPS data points from within the first time interval. As another example, one or more devices 102, such as a second device 102, may be related to a single GPS data point from within the first time interval. As another example, one or more devices 102, such as a third device 102, may indicate a velocity of third device 102. As yet another example, one or more devices 102 may be related to no GPS data points from within that time interval.

To determine whether or not device 102 may be approaching a geographic area within a second time interval, certain data may be more reliable than others. For example, a location determined using GPS data points may be more precise than a location determined using the cell id of the cell to which device 102 belongs. Further, while behavioral patterns may be a good indicator, historical data may not account for certain anomalies, like if the user of device 102 is traveling from work to the airport instead of going home, as reliably as current GPS data may indicate. Thus, identifying the subset of devices 102 that are likely to approach the geographic area may use the most reliable data available for determining whether to include or exclude device 102 from the subset of devices 102 receiving the alert.

The accuracy of the location data may depend upon the type of the location data. For example, GPS data points may have an accuracy on the order of about 3.5 meters. As another example, device 102's detection of access point 106 may indicate device 102's location with approximately 400 meter accuracy. As another example, a cell id may identify a geographic location on the order of 1 to 30 kilometers. These accuracies may be affected based on specific factors in a given situation. For example, GPS data points may be less accurate in locations densely populated by high rises, as a result of multi-path interference. As another example, the accuracy of a location based on device 102 detecting access point 106 may depend upon the operating characteristics of access point 106. Further, the size of a cell (and in turn, the accuracy of a location based on device 102 being in a cell) may vary based on density of base stations 104 in the area.

Location data may be compiled together to improve accuracy. For example, the accuracy of a location based on device 102 being able to sense multiple access points 106 may be greater than if the location was based only on device 102 sensing a single access point 106. As another example, further considering signal strengths along with those detected access points 106 may further improve accuracy. Location data may also include analysis of raw location data. For example, location data may include a Rayleigh fading rate, trilateration based on multiple locations (and optionally signal strengths), or other known location techniques.

Step 414 may include identifying a subset of the plurality of devices 102 that are within a vicinity of a geographic area affected by a traffic event. Populating the subset may comprise affirmatively identifying devices 102 that are within the vicinity, eliminating from the subset devices 102 that are outside of the vicinity, or any combination thereof. For example, there may be devices 102 whose location data indicates that device 102 is far outside of the vicinity. For example, if the geographic area is located in Atlanta, Ga., and a particular device 102 is located—based on its location data—in Dayton, Ohio, that distant device 102 may be filtered from the subset. As another example, if the geographic area is located on 14th Street in Atlanta, and the location data indicates that another device 102 is traveling down that street, that device 102 may be included in the subset. There may be other devices, 102 for example, that have location data that does not clearly indicate whether device 102 is inside or outside of the subset. For example, if the location data indicates that another device 102 is within a cell that encompasses—but is not entirely made of—the vicinity, then depending upon the specific implementation or other factors that device may or may not be included in the subset.

Identifying devices 102 within a vicinity of the geographic area may be based on the accuracy of location data associated with that particular device 102. For example, if the location of device 102 is based on GPS data points, the vicinity may be a first threshold. As another example, if the location of another device 102 is based on lower-accuracy data, such as cell id, then the vicinity may differ. For example, it may be desirable to filter out those devices 102 that, based on their GPS location, are more than 1 km downstream of the geographic area (e.g., such that their GPS location indicates that even if such device 102 is traveling in the direction of the geographic area, the device 102 has already passed the traffic event). On the other hand, it may not be appropriate to eliminate devices 102 whose only location data indicates that they are within the cell that includes that location 1 km downstream of the geographic area, particularly if the same cell also includes the geographic area and another geographic area that is contiguous to and upstream of the geographic area affected by the traffic event.

The subset of devices 102 may be filtered further. The specific ways in which devices 102 are filtered (or not) may vary depending upon the contents of the location data transmitted within the first time interval that is related to that particular device.

For example, location data of certain devices 102 of the subset may indicate that those certain devices are not moving, or that their velocity does not meet a minimum threshold. These devices may be filtered out of the subset. For example, returning to the exemplary third device 102 whose location data indicates the velocity of the third device 102, that velocity may be low enough to indicate that third device 102 will not be affected by the traffic event. This includes devices 102 whose velocity indicates the devices 102 are actually not moving, such as a mobile device 102 that is sitting unused on a table. This may also include devices 102 whose location information indicates that their vertical velocity is much greater than their latitudinal or longitudinal velocity, which may suggest that device 102 is in an elevator or stairwell. It may also indicate devices 102 whose velocity suggests devices 102 are being used by pedestrians, or people inside of buildings. The velocity threshold may vary. For example, the velocity threshold may be a function of the traffic flow of that area. For example, velocities indicating movement at 2 miles per hour may, under some circumstances, indicate a pedestrian-used device 102, but if traffic is congested, that device 102 may be sitting in a vehicle in stop-and-go traffic. Thus, the velocity threshold may be tailored depending upon certain factors.

At steps 420 and 422, additional devices 102 may be filtered out of the subset based on their location data indicating that those devices 102 will not approach the geographic area within a second time interval. At step 420, it may be determined that certain devices 102 will not approach the geographic area within the second time interval based on their respective location data. The specific location data of each device 102 that may be considered in making this determination may vary. For example, for a first device 102 whose location data transmitted within the first time interval includes multiple GPS data points, this determination may be based on at least those GPS data points. But for other devices, such as the second device 102 whose location data transmitted within the first time interval may not contain more than a single GPS data point, other information, such as a second location datum, may be relied upon. For example, the second location datum may comprise non-GPS information transmitted within (or outside of) the first time interval. For example, the second location datum may comprise a cell identifier, a Wi-Fi location, access point 106 detected by second device 102, an access point handoff, or a Rayleigh fading rate. As another example, the second location datum may comprise a second GPS data point of second device 102 that was transmitted or timestamped outside of the first time interval. For example, such GPS data points may be used to predict historical behaviors of second device 102, as discussed above. Such determinations that device 102 will not approach the geographic area may be performed similarly to those determinations that device 102 will approach the geographic area, such as those methods discussed in FIGS. 5 and 6.

Other methods for determining whether device 102 may approach the geographic location within the second time interval may be used, and the selection of which method to use may depend upon the location data available for that device. For example, as discussed above, location data transmitted within the first time interval may include no GPS data points. Determination of whether to filter out or to include such devices 102 may depend upon determining whether such device 102 is moving, such as indicated by second location data of that device, the accuracy of such determinations, and the density of the geographic area, as discussed above. For example, the higher the density of the geographic area, the lower the accuracy of such location data may be required to include or exclude the related device 102 in or from the subset.

Once devices 102 determined to not approach the geographic area are filtered out of the subgroup at step 422, at step 424, an alert may be sent to the subset.

Figure 7:
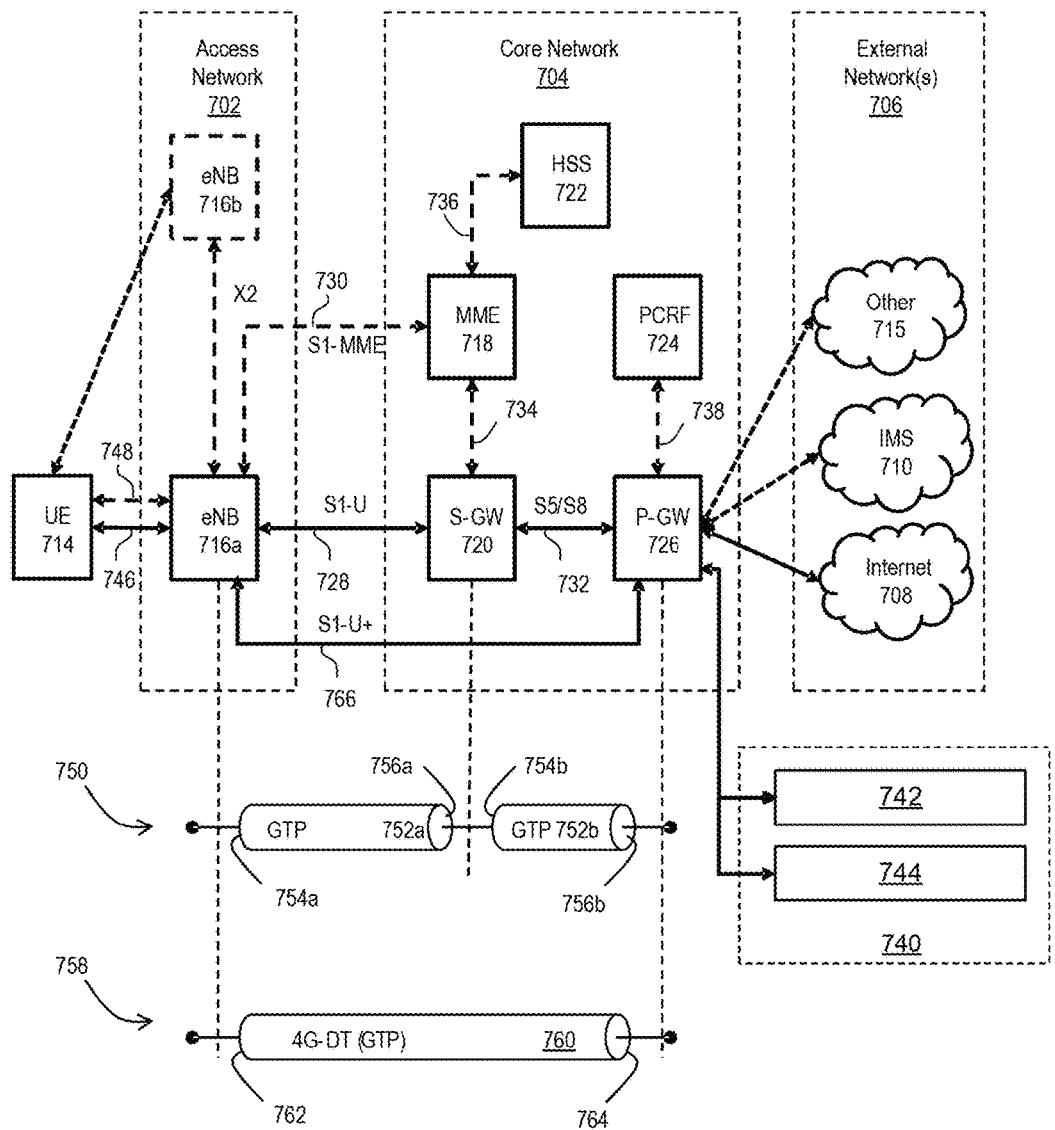
FIG. 7 is an exemplary network architecture.

FIG. 7 illustrates a functional block diagram depicting one example of an LTE-EPS network architecture 700 related to the current disclosure. In particular, the network architecture 700 disclosed herein is referred to as a modified LTE-EPS architecture 700 to distinguish it from a traditional LTE-EPS architecture.

An example modified LTE-EPS architecture 700 is based at least in part on standards developed by the 3rd Generation Partnership Project (3GPP), with information available at www.3gpp.org. In one embodiment, the LTE-EPS network architecture 700 includes an access network 702, a core network 704, e.g., an EPC or Common BackBone (CBB) and one or more external networks 706, sometimes referred to as PDN or peer entities. Different external networks 706 can be distinguished from each other by a respective network identifier, e.g., a label according to DNS naming conventions describing an access point to the PDN. Such labels can be referred to as Access Point Names (APN). External networks 706 can include one or more trusted and non-trusted external networks such as an internet protocol (IP) network 708, an IP multimedia subsystem (IMS) network 710, and other networks 712, such as a service network, a corporate network, or the like. Network 110 or network 114 may include one or more access networks 702, core networks 704, or an external networks 706.

Access network 702 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 702 can include one or more communication devices, commonly referred to as UE 714, and one or more wireless access nodes, or base stations 716a, 716b. During network operations, at least one base station 716 communicates directly with UE 714. Base station 716 can be an evolved Node B (e-NodeB), with which UE 714 communicates over the air and wirelessly. UEs 714 can include, without limitation, wireless devices, e.g., satellite communication systems, portable digital assistants (PDAs), laptop computers, tablet devices and other mobile devices (e.g., cellular telephones, smart appliances, and so on). UEs 714 can connect to eNBs 716 when UE 714 is within range according to a corresponding wireless communication technology.

UE 714 generally runs one or more applications that engage in a transfer of packets between UE 714 and one or more external networks 706. Such packet transfers can include one of downlink packet transfers from external network 706 to UE 714, uplink packet transfers from UE 714 to external network 706 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 704, e.g., according to parameters, such as the QoS.

Core network 704 uses a concept of bearers, e.g., EPS bearers, to route packets, e.g., IP traffic, between a particular gateway in core network 704 and UE 714. A bearer refers generally to an IP packet flow with a defined QoS between the particular gateway and UE 714. Access network 702, e.g., E UTRAN, and core network 704 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

Core network 704 may include various network entities, such as MME 718, SGW 720, Home Subscriber Server (HSS) 722, Policy and Charging Rules Function (PCRF) 724 and PGW 726. For example, MME 718 may include a control node performing a control signaling between various equipment and devices in access network 702 and core network 704. The protocols running between UE 714 and core network 704 are generally known as Non-Access Stratum (NAS) protocols.

For illustration purposes only, the terms MME 718, SGW 720, HSS 722 and PGW 726, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 720 routes and forwards all user data packets. SGW 720 also acts as a mobility anchor for user plane operation during handovers between base stations, e.g., during a handover from first eNB 716a to second eNB 716b as may be the result of UE 714 moving from one area of coverage, e.g., cell, to another. SGW 720 can also terminate a downlink data path, e.g., from external network 706 to UE 714 in an idle state, and trigger a paging operation when downlink data arrives for UE 714. SGW 720 can also be configured to manage and store a context for UE 714, e.g., including one or more of parameters of the IP bearer service and network internal routing information. In addition, SGW 720 can perform administrative functions, e.g., in a visited network, such as collecting information for charging (e.g., the volume of data sent to or received from the user), or replicate user traffic, e.g., to support a lawful interception. SGW 720 also serves as the mobility anchor for interworking with other 3GPP technologies such as universal mobile telecommunication system (UMTS).

At any given time, UE 714 is generally in one of three different states: detached, idle, or active. The detached state is typically a transitory state in which UE 714 is powered on but is engaged in a process of searching and registering with network 702. In the active state, UE 714 is registered with access network 702 and has established a wireless connection, e.g., radio resource control (RRC) connection, with eNB 716. Whether UE 714 is in an active state can depend on the state of a packet data session, and whether there is an active packet data session. In the idle state, UE 714 is generally in a power conservation state in which UE 714 typically does not communicate packets. When UE 714 is idle, SGW 720 can terminate a downlink data path, e.g., from a peer entity such as network 706, and triggers paging of UE 714 when data arrives for UE 714. If UE 714 responds to the page, SGW 720 can forward the IP packet to eNB 716a.

HSS 722 can manage subscription-related information for a user of UE 714. For example, tHSS 722 can store information such as authorization of the user, security requirements for the user, quality of service (QoS) requirements for the user, etc. HSS 722 can also hold information about external networks 706 to which the user can connect, e.g., in the form of an APN of external networks 706. For example, MME 718 can communicate with HSS 722 to determine if UE 714 is authorized to establish a call, e.g., a voice over IP (VoIP) call before the call is established.

PCRF 724 can perform QoS management functions and policy control. PCRF 724 is responsible for policy control decision-making, as well as for controlling the flow-based charging functionalities in a policy control enforcement function (PCEF), which resides in PGW 726. PCRF 724 provides the QoS authorization, e.g., QoS class identifier and bit rates that decide how a certain data flow will be treated in the PCEF and ensures that this is in accordance with the user's subscription profile.

PGW 726 can provide connectivity between the UE 714 and one or more of the external networks 706. In illustrative network architecture 700, PGW 726 can be responsible for IP address allocation for UE 714, as well as one or more of QoS enforcement and flow-based charging, e.g., according to rules from the PCRF 724. PGW 726 is also typically responsible for filtering downlink user IP packets into the different QoS-based bearers. In at least some embodiments, such filtering can be performed based on traffic flow templates. PGW 726 can also perform QoS enforcement, e.g., for guaranteed bit rate bearers. PGW 726 also serves as a mobility anchor for interworking with non-3GPP technologies such as CDMA2000.

Within access network 702 and core network 704 there may be various bearer paths/interfaces, e.g., represented by solid lines 728 and 730. Some of the bearer paths can be referred to by a specific label. For example, solid line 728 can be considered an S1-U bearer and solid line 732 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 704 can include various signaling bearer paths/interfaces, e.g., control plane paths/interfaces represented by dashed lines 730, 734, 736, and 738. Some of the signaling bearer paths may be referred to by a specific label. For example, dashed line 730 can be considered as an S1-MME signaling bearer, dashed line 734 can be considered as an S11 signaling bearer and dashed line 736 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 766. In the illustrative example, the S1-U+ user plane interface extends between the eNB 716a and PGW 726. Notably, S1-U+ path/interface does not include SGW 720, a node that is otherwise instrumental in configuring and/or managing packet forwarding between eNB 716a and one or more external networks 706 by way of PGW 726. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 720, 726 due to excessive handover events.

In some embodiments, PGW 726 is coupled to storage device 740, shown in phantom. Storage device 740 can be integral to one of the network nodes, such as PGW 726, for example, in the form of internal memory and/or disk drive. It is understood that storage device 740 can include registers suitable for storing address values. Alternatively or in addition, storage device 740 can be separate from PGW 726, for example, as an external hard drive, a flash drive, and/or network storage.

Storage device 740 selectively stores one or more values relevant to the forwarding of packet data. For example, storage device 740 can store identities and/or addresses of network entities, such as any of network nodes 718, 720, 722, 724, and 726, eNBs 716 and/or UE 714. In the illustrative example, storage device 740 includes a first storage location 742 and a second storage location 744. First storage location 442 can be dedicated to storing a Currently Used Downlink address value 742. Likewise, second storage location 744 can be dedicated to storing a Default Downlink Forwarding address value 444. PGW 726 can read and/or write values into either of storage locations 742, 744, for example, managing Currently Used Downlink Forwarding address value 742 and Default Downlink Forwarding address value 744 as disclosed herein.

In some embodiments, the Default Downlink Forwarding address for each EPS bearer is the SGW S5-U address for each EPS Bearer. The Currently Used Downlink Forwarding address" for each EPS bearer in PGW 726 can be set every time when PGW 726 receives an uplink packet, e.g., a GTP-U uplink packet, with a new source address for a corresponding EPS bearer. When UE 714 is in an idle state, the "Current Used Downlink Forwarding address" field for each EPS bearer of UE 714 can be set to a "null" or other suitable value.

In some embodiments, the Default Downlink Forwarding address is only updated when PGW 726 receives a new SGW S5-U address in a predetermined message or messages. For example, the Default Downlink Forwarding address is only updated when PGW 726 receives one of a Create Session Request, Modify Bearer Request and Create Bearer Response messages from SGW 720.

As values 742, 744 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 702 and core network 704 are illustrated in a simplified block diagram in FIG. 7. In other words, either or both of access network 702 and the core network 704 can include additional network elements that are not shown, such as various routers, switches and controllers. In addition, although FIG. 7 illustrates only a single one of each of the various network elements, it should be noted that access network 702 and core network 704 can include any number of the various network elements. For example, core network 704 can include a pool (i.e., more than one) of MMEs 718, SGWs 720 or PGWs 726.

In the illustrative example, data traversing a network path between UE 714, eNB 716a, SGW 720, PGW 726 and external network 706 may be considered to constitute data transferred according to an end-to-end IP service. However, for the present disclosure, to properly perform establishment management in LTE-EPS network architecture 700, the core network, data bearer portion of the end-to-end IP service is analyzed.

An establishment may be defined herein as a connection set up request between any two elements within LTE-EPS network architecture 700. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 746) between UE 714 and eNB 716a, a second portion (e.g., an S1 data bearer 728) between eNB 716a and SGW 720, and a third portion (e.g., an S5/S8 bearer 732) between SGW 720 and PGW 726. Various signaling bearer portions are also illustrated in FIG. 7. For example, a first signaling portion (e.g., a signaling radio bearer 748) between UE 714 and eNB 716a, and a second signaling portion (e.g., S1 signaling bearer 730) between eNB 716a and MME 718.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network architecture 700, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 750 includes a first tunnel 752a between two tunnel endpoints 754a and 756a, and a second tunnel 752b between two tunnel endpoints 754b and 756b. In the illustrative example, first tunnel 752a is established between eNB 716a and SGW 720. Accordingly, first tunnel 752a includes a first tunnel endpoint 754a corresponding to an S1-U address of eNB 716a (referred to herein as the eNB S1-U address), and second tunnel endpoint 756a corresponding to an S1-U address of SGW 720 (referred to herein as the SGW S1-U address). Likewise, second tunnel 752b includes first tunnel endpoint 754b corresponding to an S5-U address of SGW 720 (referred to herein as the SGW S5-U address), and second tunnel endpoint 756b corresponding to an S5-U address of PGW 726 (referred to herein as the PGW S5-U address).

In at least some embodiments, first tunnel solution 750 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 758 includes a single or direct tunnel 760 between tunnel endpoints 762 and 764. In the illustrative example, direct tunnel 760 is established between eNB 716a and PGW 726, without subjecting packet transfers to processing related to SGW 720. Accordingly, direct tunnel 760 includes first tunnel endpoint 762 corresponding to the eNB S1-U address, and second tunnel endpoint 764 corresponding to the PGW S5-U address. Packet data received at either end can be encapsulated into a payload and directed to the corresponding address of the other end of the tunnel. Such direct tunneling avoids processing, e.g., by SGW 720 that would otherwise relay packets between the same two endpoints, e.g., according to a protocol, such as the GTP-U protocol.

In some scenarios, direct tunneling solution 758 can forward user plane data packets between eNB 716a and PGW 726, by way of SGW 720. That is, SGW 720 can serve a relay function, by relaying packets between two tunnel endpoints 716a, 726. In other scenarios, direct tunneling solution 758 can forward user data packets between eNB 716a and PGW 726, by way of the S1 U+ interface, thereby bypassing SGW 720.

Generally, UE 714 can have one or more bearers at any one time. The number and types of bearers can depend on applications, default requirements, and so on. It is understood that the techniques disclosed herein, including the configuration, management and use of various tunnel solutions 750, 758, can be applied to the bearers on an individual bases. That is, if user data packets of one bearer, say a bearer associated with a VoIP service of UE 714, then the forwarding of all packets of that bearer are handled in a similar manner. Continuing with this example, the same UE 714 can have another bearer associated with it through the same eNB 716a. This other bearer, for example, can be associated with a relatively low rate data session forwarding user data packets through core network 704 simultaneously with the first bearer. Likewise, the user data packets of the other bearer are also handled in a similar manner, without necessarily following a forwarding path or solution of the first bearer. Thus, one of the bearers may be forwarded through direct tunnel 758; whereas, another one of the bearers may be forwarded through a two-tunnel solution 750.

Figure 8:
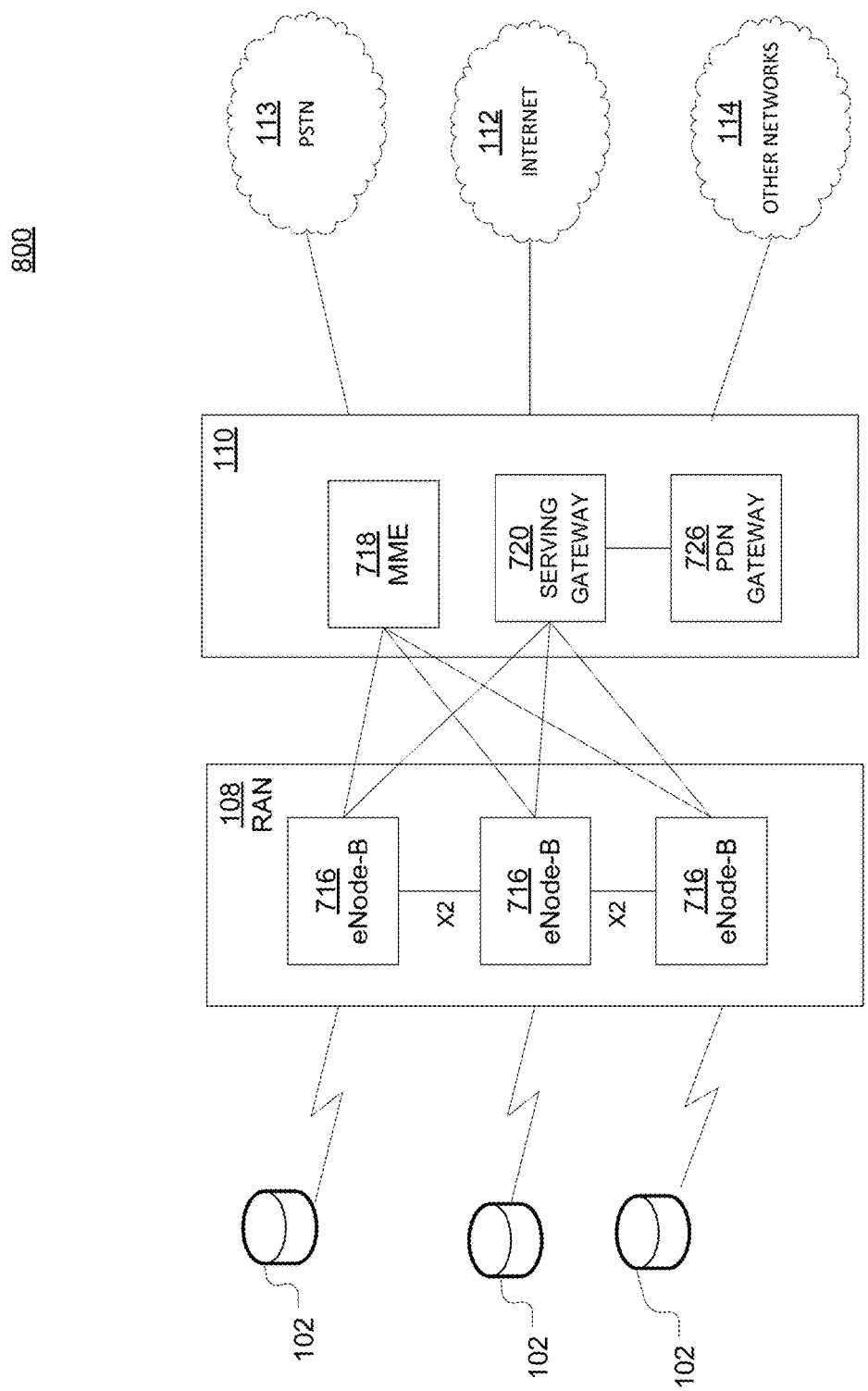
FIG. 8 depicts an exemplary communication system that provides wireless telecommunication services over wireless communication networks.

FIG. 8 is an example system 800 including RAN 108 and core network 110. As noted above, RAN 108 may employ an E-UTRA radio technology to communicate with devices 102 over air interface. RAN 108 may also be in communication with core network 110.

RAN 108 may include any number of eNode-Bs 716 while remaining consistent with the disclosed technology. One or more eNode-Bs 716 may include one or more transceivers for communicating with the devices 102 over air interface. Optionally, eNode-Bs 716 may implement MIMO technology. Thus, one of eNode-Bs 716, for example, may use multiple antennas to transmit wireless signals to, or receive wireless signals from, one of Devices 102.

Each of eNode-Bs 716 may be associated with a particular cell (not shown) and may be configured to handle radio resource management decisions, handover decisions, scheduling of users in the uplink or downlink, or the like. As shown in FIG. 7 eNode-Bs 716 may communicate with one another over an X2 interface.

Core network 110 shown in FIG. 7 may include a mobility management gateway or entity (MME) 718, a serving gateway 720, or a packet data network (PDN) gateway 726. While each of the foregoing elements are depicted as part of core network 110, it will be appreciated that any one of these elements may be owned or operated by an entity other than the core network operator.

MME 718 may be connected to each of eNode-Bs 716 in RAN 108 via an S1 interface and may serve as a control node. For example, MME 718 may be responsible for authenticating users of devices 102, bearer activation or deactivation, selecting a particular serving gateway during an initial attach of devices 102, or the like. MME 718 may also provide a control plane function for switching between RAN 108 and other RANs (not shown) that employ other radio technologies, such as GSM or WCDMA.

Serving gateway 706 may be connected to each of eNode-Bs 716 in RAN 108 via the S1 interface. Serving gateway 720 may generally route or forward user data packets to or from the devices 102. Serving gateway 720 may also perform other functions, such as anchoring user planes during inter-eNode B handovers, triggering paging when downlink data is available for devices 102, managing or storing contexts of devices 102, or the like.

Serving gateway 720 may also be connected to PDN gateway 726, which may provide devices 102 with access to packet-switched networks, such as Internet 112, to facilitate communications between devices 102 and IP-enabled devices.

Core network 110 may facilitate communications with other networks. For example, core network 110 may provide devices 102 with access to circuit-switched networks, such as PSTN 113, to facilitate communications between devices 102 and traditional land-line communications devices. In addition, core network 110 may provide the devices 102 with access to other networks 114, which may include other wired or wireless networks that are owned or operated by other service providers.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
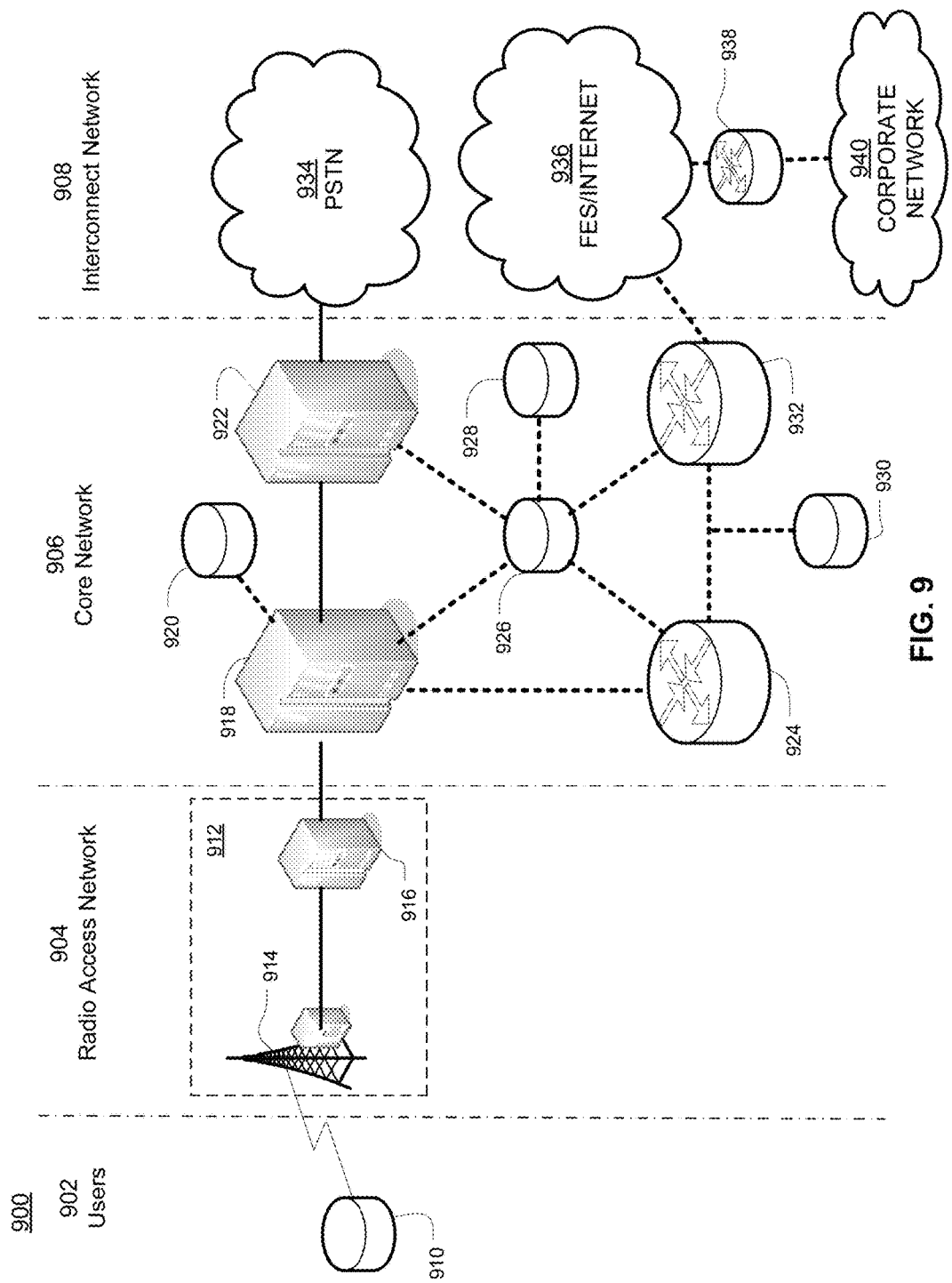
FIG. 9 illustrates an exemplary architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., device 102, network device 300, or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
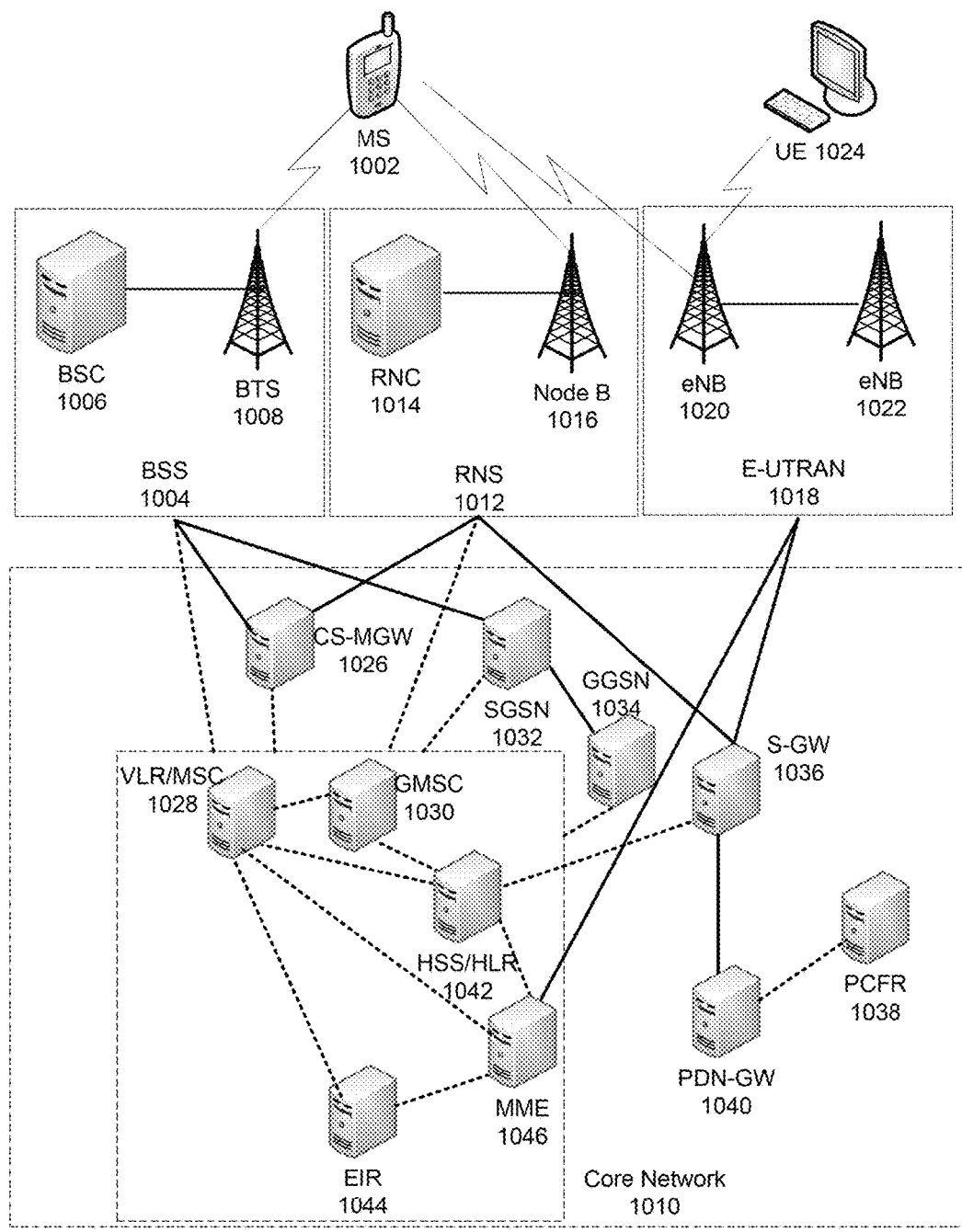
FIG. 10 is a block diagram of an exemplary public land mobile network (PLMN).

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, device 102, vehicle 103, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location data such as, but not limited to, GGSN address for each GGSN 1034 where an active PDP exists. GGSN 1034 may implement a location register function to store subscriber data it receives from SGSN 1032 such as subscription or location data.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location data. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location data to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

While examples of a telecommunications system in which vehicle alerts can be generated and communicated have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A method comprising:
   receiving, at a network device of a network, location data transmitted during a first time interval, the location data being related to a plurality of devices, wherein the location data includes at least two global positioning system (GPS) data points of a first device, a single GPS data point of a second device, and information related to a velocity of a third device;
   identifying, based at least on the location data, a subset of the plurality of devices that are within a vicinity of a geographic area associated with a traffic event, the subset comprising the first device, the second device, the third device, and a fourth device;
   determining that the first device will not approach the geographic area during a second time interval based at least on the at least two GPS data points;
   determining that the second device will not approach the geographic area during the second time interval based at least on the single GPS data point and a second location datum;
   based at least on the information related to the velocity of the third device indicating that the velocity of the third device does not exceed a threshold, filtering, by the network device, the third device from the subset;
   based on the determining that the first device will not approach the geographic area during the second time interval and based on the determining that the second device will not approach the geographic area during the second time interval, filtering, by the network device, the first device and the second device from the subset; and
   transmitting, via the network, an alert indicative of the traffic event to the subset.

2. The method of claim 1, wherein each datum of the location data is associated with at least one time within the first time interval.

3. The method of claim 1, wherein the second location datum comprises a second GPS data point of the second device, the second GPS data point transmitted prior to the first time interval.

4. The method of claim 1, wherein the at least two GPS data points are timestamped within the first time interval.

5. The method of claim 1, wherein the single GPS data point is timestamped within the first time interval.

6. The method of claim 1, wherein the location data of the second device comprises the second location datum, and wherein a type of the second location datum is non-GPS data.

7. The method of claim 1, wherein the second location datum comprises a cell identifier, a Wi-Fi location, an access point detected by the second device, an access point handoff, or a Rayleigh fading rate.

8. The method of claim 1, wherein the subset further comprises a fifth device, the method further comprising:
   comparing the traffic event to a historical traffic pattern for the geographic area;

based on the comparing, determining that the traffic event is chronic; and prior to transmitting the alert, filtering the subset to exclude the fourth device based on the fourth device having previously traversed the geographic area.

9. The method of claim 1, further comprising:
receiving, via the network, sensor data from a plurality of sources;
deriving, based on the sensor data, an acceleration pattern for the geographic area; and
identifying the traffic event based at least on the acceleration pattern.

10. A system comprising:
an input/output;
a processor communicatively coupled to the input/output; and
memory storing instructions that cause the processor to effectuate operations, the operations comprising:
receiving, via the input/output, location data transmitted during a first time interval, the location data being related to a plurality of devices, wherein the location data includes at least two global positioning system (GPS) data points of a first device, a single GPS data point of a second device, and information related to a velocity of a third device;
identifying, based at least on the location data, a subset of the plurality of devices that are within a vicinity of a geographic area associated with a traffic event, the subset comprising the first device, the second device, the third device, and a fourth device;
determining that the first device will not approach the geographic area during a second time interval based at least on the at least two GPS data points;
determining that the second device will not approach the geographic area during the second time interval based at least on the single GPS data point and a second location datum;
subset based at least on the information related to the velocity of the third device indicating that the velocity of the third device does not exceed a threshold, filtering the third device from the;
based on the determining that the first device will not approach the geographic area during the second time interval and based on the determining that the second device will not approach the geographic area during the second time interval, filtering the first device and the second device from the subset; and
transmitting, via the input/output, an alert indicative of the traffic event to the subset.

11. The system of claim 10, wherein the at least two GPS points of the first device comprise GPS data generated by a related device related to the first device.

12. The system of claim 10, wherein the single GPS data point of the second device comprises GPS data generated by a related device related to the second device.

13. The system of claim 10, wherein the location data related to the second device comprises the second location datum, and wherein a type of the second location datum is non-GPS data.

14. The system of claim 10, wherein the second location datum comprises a second GPS data point of the second device, wherein a timestamp of the second GPS data point of the second device is outside of the first time interval.

15. A method comprising:
receiving, at a network device of a network, location data transmitted during a first time interval, the location data being related to a plurality of devices, wherein the location data includes at least two global positioning system (GPS) data points of a first device and a single GPS data point of a second device;
identifying, based at least on the location data, a subset of the plurality of devices by filtering out a distant device that is outside of a vicinity of a geographic area associated with a traffic event, the subset comprising the first device, the second device, and a third device;
determining that the first device will not approach the geographic area during a second time interval based at least on the at least two GPS data points;
determining that the second device will not approach the geographic area during the second time interval based at least on the single GPS data point and a second location datum;
based on the determining that the first device will not approach the geographic area during the second time interval and based on the determining that the second device will not approach the geographic area during the second time interval, filtering, by the network device, the first device and the second device from the subset; and
transmitting, via the network, an alert indicative of the traffic event to the subset.

16. The method of claim 15, wherein the second location datum comprises a cell identifier, a Wi-Fi location, an access point detected by the second device, an access point handoff, or a Rayleigh fading rate.

17. The method of claim 15, wherein the subset comprises a fourth device, and the location data of the third device comprises no GPS data points, the method further comprising:
estimating a movement of the third device based on the location data of the third device, the movement indicating that the third device is moving towards the geographic area;
determining a density of the geographic area; and
filtering the third device from the subset based on the density.

18. The method of claim 17, further comprising:
determining an accuracy of the estimated movement,
wherein filtering the third device from the subset is further based on the accuracy.

19. The method of claim 15, wherein the location data related to the first device comprises location data of a related device associated with the first device.

20. The method of claim 15, wherein the location data related to the second device comprises location data of a related device associated with the second device.

* * * * *